United States Patent [19]

Grube et al.

[11] Patent Number: 5,778,304
[45] Date of Patent: Jul. 7, 1998

[54] METHOD FOR PROVIDING COMMUNICATION SERVICES BASED ON GEOGRAPHIC LOCATION

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 517,180

[22] Filed: Aug. 21, 1995

Related U.S. Application Data

[63] Continuation of Ser. No. 209,777, Mar. 10, 1994, abandoned.

[51] Int. Cl.[6] ......................................... H04Q 7/38
[52] U.S. Cl. .................... 455/33.1; 455/53.1; 455/54.1
[58] Field of Search .......................... 455/33.1, 33.2, 455/53.1, 54.1, 56.1, 62, 63, 67.1; 342/357, 451, 452, 454, 456; 340/991, 994

[56] References Cited

U.S. PATENT DOCUMENTS

| | | | |
|---|---|---|---|
| 4,698,781 | 10/1987 | Cockerell, Jr. | 342/451 |
| 5,055,851 | 10/1991 | Sheffer | 455/33.1 |
| 5,214,789 | 5/1993 | George | 455/33.2 |
| 5,235,633 | 8/1993 | Dennison et al. | 455/33.2 |
| 5,313,653 | 5/1994 | Sasuta | 455/54.2 |
| 5,442,805 | 8/1995 | Sagers et al. | 455/33.1 |

OTHER PUBLICATIONS

Klandrud, et al. "Beacon Control of Radio Transmitters to Reduce Radio Frequency Interference" Motorola's Technical Developments, vol. 16, Aug. 1992.

*Primary Examiner*—Reinhard J. Eisenzopf
*Assistant Examiner*—Thanh Le
*Attorney, Agent, or Firm*—Daniel C. Crilly; Timothy W. Markison

[57] ABSTRACT

Communication services can be controlled within geographic areas (126) by a communication resource controller (101). This occurs, when the communication resource controller (101) receives the location of a particular communication unit (102, 103) and a particular service request. Having this information, the communication resource controller (101) accesses a database (124) and determines whether that particular service request is restricted in the area that the unit is located. If the service is restricted in that area, the communication unit's (102, 103) request is denied.

11 Claims, 3 Drawing Sheets

METHOD FOR PROVIDING COMMUNICATION SERVICES BASED ON GEOGRAPHIC LOCATION

This is a continuation of application Ser. No. 08/209,777, filed Mar. 10, 1994 and now abandoned.

FIELD OF THE INVENTION

This invention relates generally to communication systems, and, in particular, to controlling communication services based on geographic location.

BACKGROUND OF THE INVENTION

Communication systems are known to include a communication resource controller, a plurality of communication units, and communication resources. In such communication systems, the communication units communicate with each other via the communication resources, where a communication resource may be an RF channel, a pair of RF channels, a TDM slot, or any medium for carrying RF signals. To initiate a communication, a communication unit transmits a communication request to the communication resource controller via a communication resource dedicated for control information (control channel). The communication request includes a request for a particular service, such as allocation of a communication resource and identity of a target communication unit, or units. For example, the request may be for a group call which identifies all the communication units in the same group as the initiating communication unit.

Upon receiving this request, the communication resource controller determines whether the communication unit is authorized to access the system and, if so, grants the request. Having granted the request, the communication resource controller allocates a communication resource to the initiating communication unit and the target communication units, and then transmits a communication resource allocation message on the control channel. All communication units within the coverage area of the control channel antenna receive the allocation message. However, only the communication units identified in the message, i.e., the initiating and target communication units, will access the allocated communication resource and subsequently partake in the communication.

This method of communication resource allocation works very well in many trunking communication system applications, however, because of specific user needs, this method has its limitations. When a specific user need is location dependent, the operator of the communication unit must remember the specific operating requirements. For example, assume that the operator is located within a hospital, where, based on hospital regulations, speaker volume levels are limited and/or certain types of RF transmissions prohibited. If the operator forgets these specific operating requirements, the hospital regulations will be violated.

In the above example, violating the speaker volume level setting is not a tremendously serious offense, however, violating other requirements could be very serious. As an example, assume the hospital's RF transmission restriction is near an operating room that is using RF, or RF sensitive, surgical equipment. If the communication unit operator violates this restriction, the RF, or RF sensitive, surgical equipment could be interfered with, thus jeopardizing the surgical procedure.

Therefore, a need exists for a method that automatically controls communication services based on geographic location of communication units.

DESCRIPTION OF A PREFERRED EMBODIMENT

Generally, the present invention provides a method that controls communication services based on geographic location. This is accomplished when a communication resource controller receives location coordinates of a communication unit. Upon receiving this information, the resource controller determines whether the communication unit is located within a predetermined geographic region. If the communication unit is within the predetermined geographic region, the communication resource controller transmits a predefined message. The predefined message may indicate a maximum volume setting, or limit certain types of communication services, or disable the communication unit entirely. With such a method, accessibility to communication services within a predefined area can be automatically controlled, thus substantially eliminating the potential for human error.

Figure 1:
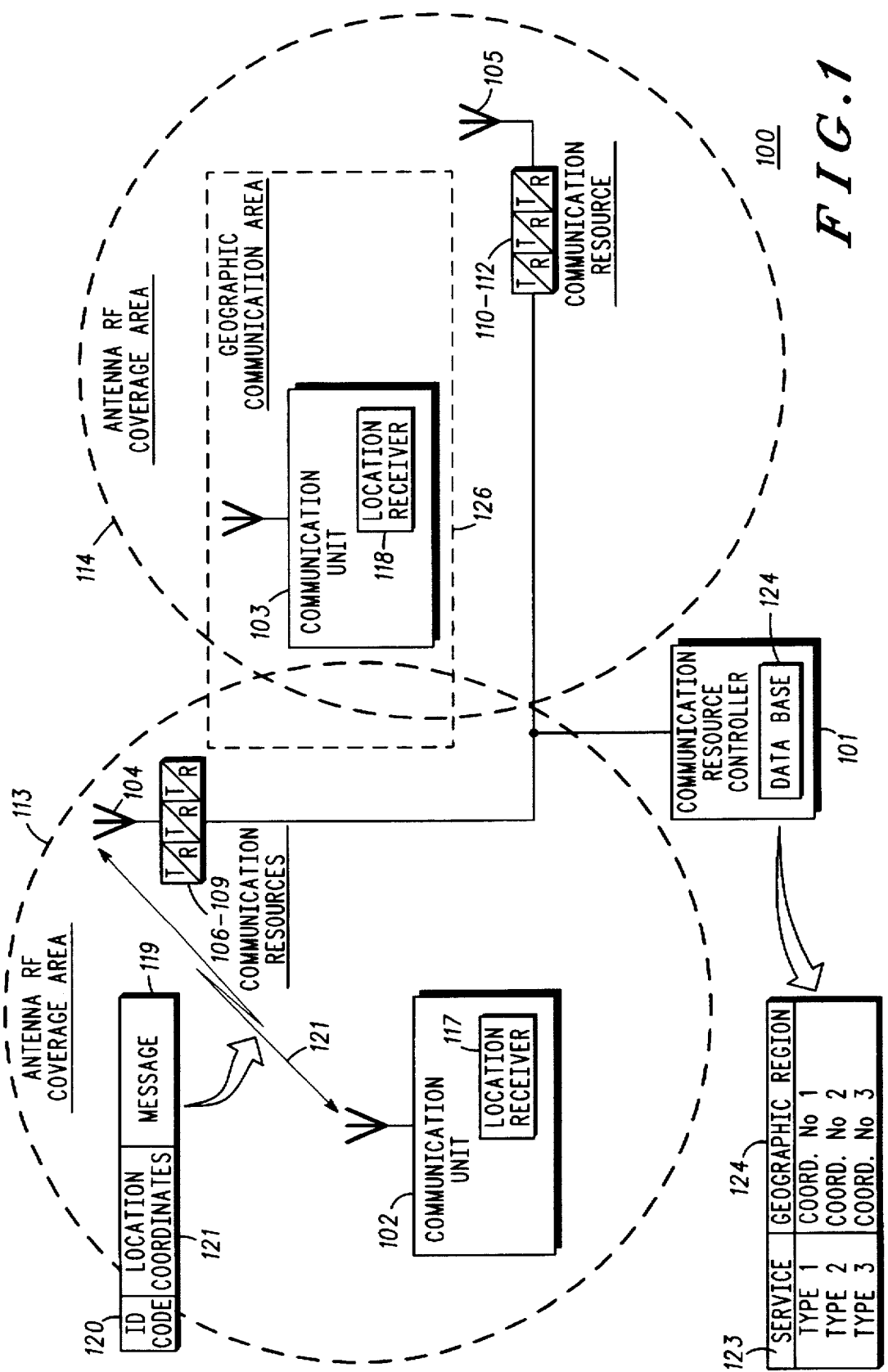
FIG. 1 illustrates a communication system that incorporates the present invention.

The present invention can be more fully described with reference to FIGS. 1–3. FIG. 1 illustrates a communication system 100 and includes a communication resource controller (101), a plurality of communication units (102, 103), a plurality of antennas (104, 105), and a limited number of communication resources (106–112). Each of the antennas (104, 105), which may be incorporated into a base station such as Motorola QUANTAR™, has an RF coverage area (113, 114). Each of the communication units (102, 103) includes a location receiver (117, 118), which may be a global positioning satellite receiver that is coupled to a communication processor (not shown).

Within the communication system 100, any of the communication units (102, 103) may initiate a communication by transmitting a request to the communication resource controller (101). The communication resource controller (101), which may be a Motorola trunking central controller, includes a database (124) which it accesses to determine the type of request received. In addition to receiving the request (119), the communication resource controller also receives the location (121) of the particular communication unit and the unit's identification code (120). Based on this information, the communication resource controller (101) accesses its database (124) to determine the type of service requested (123) and where that geographic region is limited (125). As an example, assume that communication unit (103) is within the geographic region (126) and has transmitted a service request for a communication. Upon receiving this request, the communication resource controller (101) accesses its database (124) and determines for this particular type of call (124) and geographic region (125), that the service must be restricted. The service may be restricted in a variety of ways. For example, the restriction may be a maximum volume level setting, prohibition of the service requested, or a limitations on the service requested. Note that the service requested may be any type of communication system feature, such as, but not limited to, telephone interconnect, group calls, private calls, data transmissions, and graphic message transmissions.

Upon determining the restriction, the communication resource controller (101) transmits a message to the communication unit (103) indicating the restriction. This message may also be sent to any other communication units located within the geographic region (126), thus all units within the geographic region (126) are automatically aware of the restriction.

Figure 2:
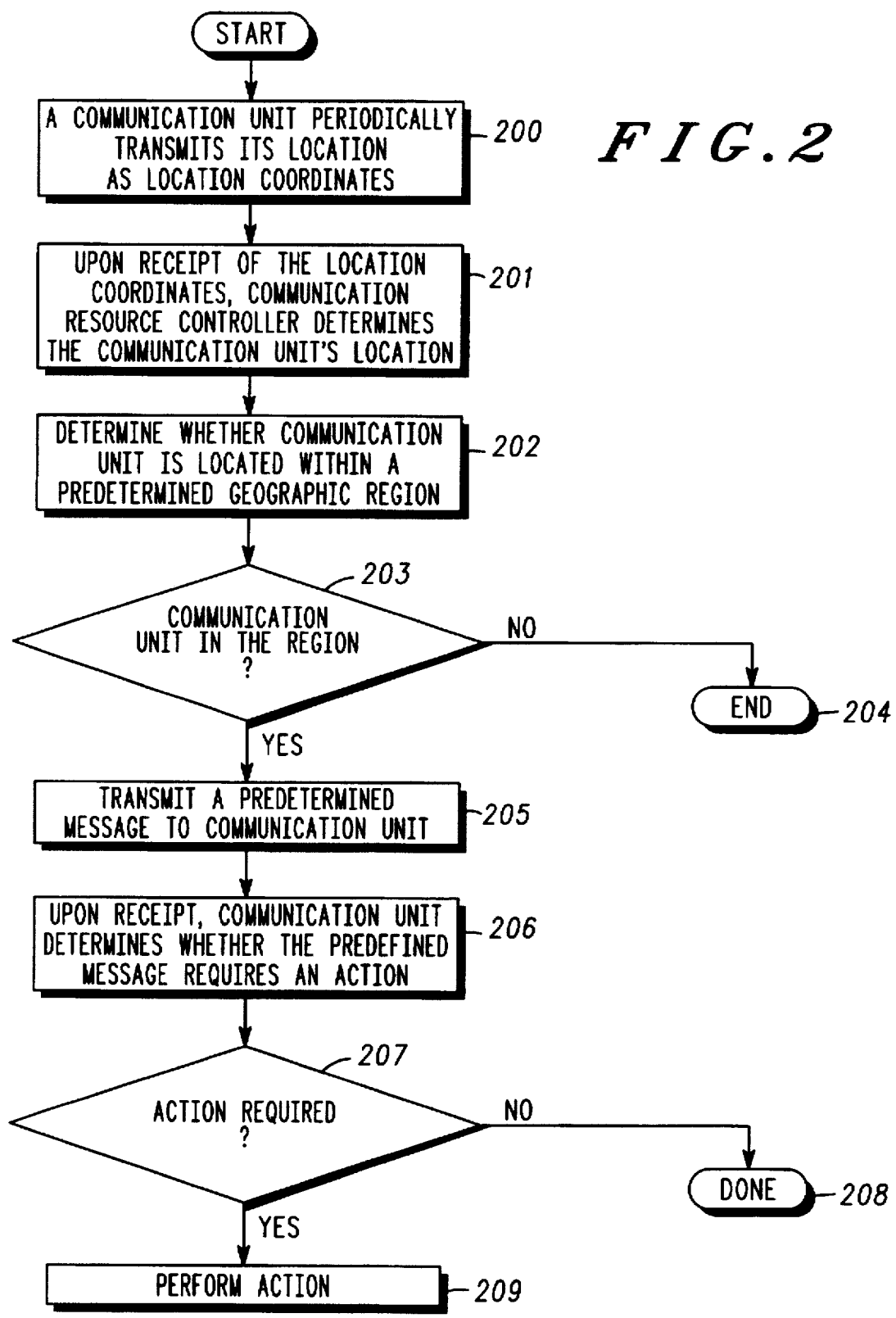
FIG. 2 illustrates a logic diagram that may be used to implement the present invention.

To further illustrate the above discussion, consider the logic diagram of FIG. 2. At step (200), a communication unit periodically, or upon request, transmits its location as location coordinates. The location coordinates are determined via the GPS receiver located within the communication unit. Once the location coordinates have been received, the communication resource controller determines the communication unit's location (201). This is a relatively simple process which can be accomplished by interpreting the location coordinates and mapping them against a particular geographic area. Having the communication unit's location, the communication resource controller determines whether the unit is located within a predetermined geographic region (202), i.e., the communication resource controller accesses its database and compares the unit's location with coordinates that define the predetermined geographic region. The predetermined geographic region may be established based on user requirements, for example, a hospital area, a construction site, a particular part of the city, or a library. If the communication unit is not within the predetermined geographic region (203), the process ends (204), i.e., there will be no restrictions on the communication unit's ability to access the communication services.

If, however, the communication unit is within the predetermined geographic region (203), the communication resource controller transmits a predefined message to the communication unit (205). The predefined message may alter, or reconfigure, the communication services that the communication unit may request such as limiting telephone interconnect services, restricting RF transmissions, or setting predetermined volume levels. The message may also include a text message for display on the communication unit informing the user of these altered, or reconfigured, service capabilities, or an alarm may be triggered to indicate the reconfiguration.

Upon receipt of the predefined message, the communication unit determines whether the predefined message requires an action (206). If an action is not required (207), the process is complete (208). If however, an action is required, the action is performed (209), where the action may be setting the volume level as directed, disabling the communication unit, or disabling the services not allowed in this particular area. At the option of the communication unit operator, or the system manager, the action may be done automatically, or manually.

Figure 3:
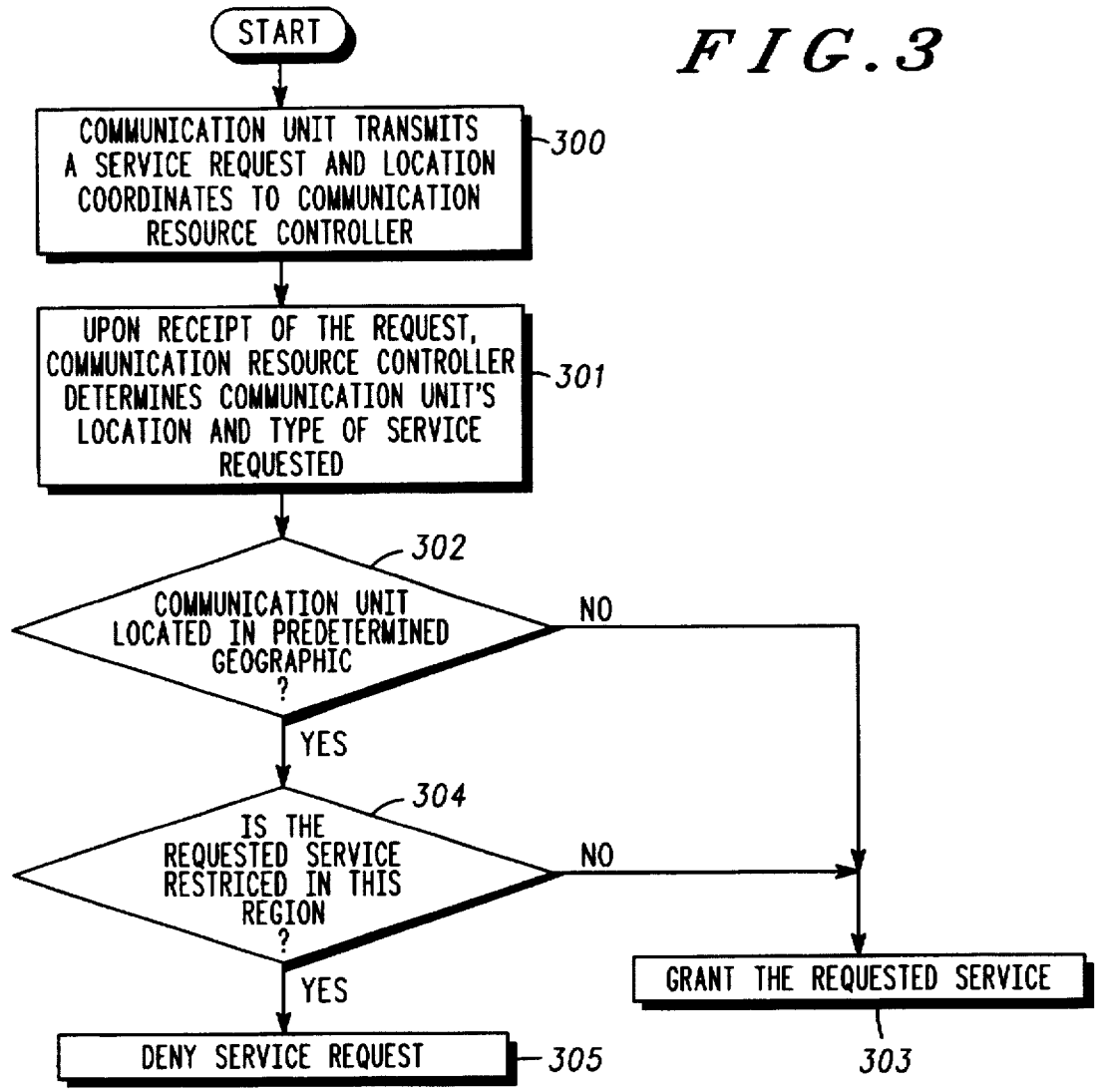
FIG. 3 illustrates a logic diagram that may be used to implement an alternative embodiment of the present invention.

FIG. 3 illustrates an alternative logic diagram that may be used to implement the present invention. At step (300), the communication unit transmits a service request and its location coordinate to the communication resource controller. Upon receipt of this information, the communication resource controller determines the communication unit's location and the particular type of service requested (301). Having this information, the communication resource controller then determines whether the communication unit is located within a predetermined geographic area (302). If the communication unit is not within the predefined geographic region (302), the particular service requested is granted (303).

If however, the communication unit is within the predetermined geographic region (302), the communication resource controller determines whether the requested service is restricted in this region (304). As described above, the database contained within the communication resource controller contains the information necessary to make this determination. If the requested service is not restricted in this region, the process proceeds to (303). If however, the service is restricted in this region, the service request is denied (305).

As an alternative to the above embodiments, a communication unit (102, 103) may determine the communication restrictions based on its location. In this embodiment, the communication unit determines its location and uses this information to address a database. Having addressed the database, the communication unit determines whether it is located within a geographic region that has restricted communication services. If the unit is in a restricted region, the communication unit retreives reconfiguration information, which indicates the communication service restrictions or new access privileges. Having this information, the communication unit reconfigures its operation in accordance with the reconfiguration information.

The present invention provides a method for controlling communication services based on geographic location. This method restricts, or controls, particular services that a communication unit can access based on that unit's geographic location. With such a method, users can define particular geographic regions and automatically control access to services in that region, thus substantially eliminating the human error factor of prior art systems.

We claim:

1. A method for a communication system controller to provide system features to a communication unit based on a geographic location of the communication unit, the method comprising the steps of:

receiving location coordinates of the communication unit and a request to use a system feature of a plurality of system features provided by the communication resource controller;

determining a location of the communication unit based on the location coordinates;

determining whether the location of the communication unit is within a predetermined geographic region;

determining whether the system feature indicated in the request is restricted within the predetermined geographic region; and transmitting service restriction information to the communication unit when the system feature indicated in the request is restricted within the predetermined geographic region and the communication unit is located within the predetermined geographic region, wherein the service restriction information identifies limitations of using the system feature in the predetermined geographic region.

2. The method of claim 1, wherein the plurality of system features comprise at least two of the group consisting of telephone interconnect, group calls, private calls, data transmissions, and graphic message transmissions.

3. A method for controlling use of system features of a communication system based on a geographic location of a communication unit, the method comprising the steps of:

transmitting, by the communication unit, location coordinates of the communication unit and a request to use a system feature of a plurality of system features provided by the communication system;

receiving, by a communication resource controller, the location coordinates and the request;

determining, by the communication resource controller, a location of the communication unit based on the location coordinates;

determining, by the communication resource controller, whether the location of the communication unit is within a predetermined geographic region;

determining, by the communication resource controller, whether the system feature indicated in the request is restricted within the predetermined geographic region;

transmitting, by the communication resource controller, service restriction information to the communication unit when the system feature indicated in the request is restricted within the predetermined geographic region and the communication unit is located within the predetermined geographic region, wherein the service restriction information identifies limitations of using the system feature in the predetermined geographic region; and utilizing, by the communication unit, the system feature in accordance with the service restriction information while the communication unit is located within the predetermined geographic region.

4. The method of claim 3, further comprising the step of triggering an alarm in the communication unit when the communication unit is located within the predetermined geographic region.

5. The method of claim 3, wherein the step of transmitting location coordinates further comprises the step of periodically transmitting, by the communication unit, the location coordinates.

6. The method of claim 3, wherein the plurality of system features comprise at least two of the group consisting of telephone interconnect, group calls, private calls, data transmissions, and graphic message transmissions.

7. The method of claim 3, wherein the step of utilizing the desired system feature comprises the step of transmitting with the desired system feature in a restricted manner while the communication unit is located within the predetermined geographic region.

8. A method for a communication unit to access system features of a communication system based on a geographic location of the communication unit, the method comprising the steps of:

determining a location of the communication unit;

determining whether the location of the communication unit is within a predetermined geographic region;

determining whether a desired system feature of a plurality of system features is restricted within the predetermined geographic region;

when the desired system feature is restricted within the predetermined geographic region and the communication unit is located within the predetermined geographic region, ascertaining limitations of use of the desired system feature in the predetermined geographic region; and utilizing the desired system feature in accordance with the limitations of use while the communication unit is located within the predetermined geographic region.

9. The method of claim 8, further comprising the step of triggering an alarm when the communication unit is located within the predetermined geographic region.

10. The method of claim 8, wherein the plurality of system features comprise at least two of the group consisting of telephone interconnect, group calls, private calls, data transmissions, and graphic message transmissions.

11. The method of claim 8, wherein the step of utilizing the desired system feature comprises the step of transmitting with the desired system feature in a restricted manner while the communication unit is located within the predetermined geographic region.

* * * * *